Patented Aug. 22, 1933

1,923,392

UNITED STATES PATENT OFFICE 1,923,392

OLEFIN-POLYSULPHIDE PLASTIC

Joseph C. Patrick, Kansas City, Mo.

No Drawing. Application June 10, 1929, Serial No. 369,912. Renewed January 19, 1933

36 Claims. (Cl. 260—17)

The present invention relates to improvements in plastic substances, and more particularly, in the type of moldable plastic materials derived by reaction between olefin compounds and polysulphides, as described in my prior application Serial No. 239,808, filed December 13, 1927.

In accordance with the present invention, I am able to better control the reaction and the character of the olefin-polysulphide plastic product, to carry out the reaction under improved conditions, and to secure a product having improved physical characteristics, together with other advantages as will more fully hereinafter appear.

In producing the olefin-polysulphide plastic in accordance with the present invention, it is preferred to employ a stabilized polysulphide solution. Although other soluble polysulphides may be employed, such as those of the alkaline metals and alkaline earth metals, including potassium, ammonium, calcium, barium, etc., for economic reasons I prefer to use the sodium polysulphide. Accordingly, in the examples hereinafter set forth, where reference is made to the use of polysulphides of sodium, it will be understood that other soluble polysulphides, such as those above referred to, may be employed in its place.

In order to stabilize the polysulphide solution, which may suitably be prepared by reaction upon a solution or suspension of the hydroxide of the base metal with sulphur, I heat the solution, either under pressure in an autoclave or under atmospheric pressure in a container provided with a reflux condenser until substantially stable equilibrium exists. In this way, the hydroxyl-ion concentration of the solution is reduced below its initial value and the polysulphide complexes present interact, a final product being secured in which there is substantially stable equilibrium. Thus, with sodium polysulphide solutions, such substantially stable equilibrium may be secured by heating the aqueous solution of the polysulphide to its boiling point at atmospheric pressure under a reflux condenser for a period of fifteen to twenty hours, or for shorter periods at higher temperatures under pressure in an autoclave.

By first heating the polysulphide solution to produce substantial equilibrium therein before reaction upon the compound containing the olefin radical, as set forth in my prior application or in accordance with the processes hereinafter set forth, I am enabled to secure a better quality of product and to better control its characteristics as well as to secure other advantages more fully apparent hereinafter.

In producing the plastic, as set forth in my prior application above referred to, an aqueous polysulphide solution, preferably diluted to approximately the same specific gravity as the olefin compound employed (ethylene dichloride, for example) is heated with the requisite amount of olefin compound, suitably to the boiling point of the mixture, under a reflux condenser, in order to effect the formation of the olefin-polysulphide plastic. I have further found that by incorporating in the aqueous reaction mixture a suitable proportion of alcohol, say from 40 to 60% by volume, the temperature at which the reaction takes place may be markedly reduced and the characteristics of the product obtained are improved. Thus, the aqueous polysulphide solution in the desired amount may be moderately heated, say from 85° to 130° F., the desired proportion of alcohol added, and the olefin compound then added, a small amount at a time. The reaction is exothermic and in batches of moderate size or large size, the rate of addition of the olefin compound is so controlled as to prevent too great a rise in temperature of the batch; say above 140 to 150° F. in the case of the hard plastic and 85 to 100° F. in the case of the soft plastic. With large batches, it may even be necessary to apply artificial cooling means to prevent the reaction mixture going to higher temperatures.

The various water-miscible and lower oil-miscible alcohols may be used, such as methyl, ethyl, propyl or isopropyl, butyl or the like; and acetone, mixtures of alcohols and acetone or of alcohols and benzol, toluol or the like may be employed in place of alcohol, as hereinbefore referred to. In general, a necessary characteristic of such a liquid is that it shall be miscible with one of the phases of the reaction mixture, either the olefin compound or the aqueous constituent, and shall tend to increase the miscibility or solubility of that phase in the other. From 10 to 80% by volume, of the reaction mixture may be alcohol or equivalent liquid. Preferably 40 to 60% may be employed.

In bringing about the reaction between the olefin compound and the aqueous polysulphide solution, I find that an improvement in the reaction and in the characteristics of the product may be secured by providing in the reaction mixture a finely divided insoluble basic compound of a metal of the alkaline earth group, such as the hydroxides of calcium, barium or magnesium, or their oxides (where such may be employed), carbonates or the like. I prefer to employ freshly formed, finely divided calcium hydroxide, lime being freshly slaked and the resulting slurry added to the reaction mixture. The proportion employed may vary, say from 1 to 5% based upon the amount of polysulphide solution present. Under these conditions, the olefin-polysulphide plastic tends to form as a powder, the texture of which is softer when the higher polysulphides are employed. In this form, the reaction product lends itself more readily to purification, washing and the other necessary handling and mixing in purification and the production of compounds.

The following examples are illustrative of the present invention.

As hereinbefore pointed out, although a polysulphide solution prepared in the ordinary manner by heating together an alkaline solution and sulphur may be employed, it is preferred to use a stabilized solution, which may be prepared as follows:

3,000 parts by weight of a high grade technical caustic soda are dissolved in about 6,000 parts of water, and from 2,000 to 4,500 parts of sulphur are added, the proportion of sulphur depending upon the relative proportion of polysulphide sulphur desired in the final product. It is desirable, although not necessary, to moisten the powdered sulphur with a suitable wetting liquid, such as alcohol, acetone, alcohol-benzol mixture or the like, which may be readily steam-stilled or distilled out of the mixture in the subsequent operations. The sulphur, wetted if desired, is placed in a container and the greater part, say 75 to 90% of the alkaline solution added. The mixture is boiled until all or nearly all of the sulphur has entered into combination and the wetting liquid, if any has been used, distilled off. The remainder of the caustic soda solution is added, together with sufficient water to increase the total volume by $\frac{1}{4}$ to $\frac{1}{2}$. The container is then heated under a reflux condenser or an autoclave under pressure to bring about a condition of substantially stable equilibrium, reduce the higher polysulphide complexes which are originally formed and to reduce the hydroxyl-ion concentration of the mixture. This is accomplished in about 20 hours at the atmospheric pressure of boiling-point, or in shorter periods when superatmospheric pressure and higher temperatures are employed. The solution is then diluted with a small proportion of water, say 15 to 20% of its volume, settled and filtered as rapidly as possible. By using substantially the same procedure, varying the quantity of sulphur employed, various polysulphides may be secured. It will be understood that the procedure is not limited to the preparation of the sodium polysulphides, but may be employed in the production of other polysulphides, such as those of potassium, ammonium, calcium, barium and the other alkali and alkaline earth metals, and that the specific condition above set forth are merely illustrative, and are not intended as limitations on the operation. As pointed out hereinbefore, the use of the sodium polysulphide is preferred for economic reasons, the base metal being eliminated from the reaction product during the preparation and purification of the olefin-polysulphide plastic.

As pointed out in my prior application, above referred to, the characteristics of the olefin-polysulphide plastic vary in accordance with the proportion of sulphur in the polysulphide employed in the reaction. Thus, those products containing up to about 74% of sulphur and corresponding to the polysulphides $XS_{1.75}$ to $XS_{3.5}$ to 3.75 are hard, resembling vulcanite, synthetic resins and the like in their physical properties, whereas those containing higher proportions of sulphur are softer and more flexible, resembling ordinary vulcanized rubber in their physical properties. The transition from one type of product to the other is not a sharp, clear one, there being an intermediate range in which the products partake in part of the properties of both types.

A typical hard product may be prepared as follows, employing a polysulphide of the empirical formula $Na_2S_{2.2}$ in a solution containing about 175 to 180 grams polysulphide sulphur per 1,000 cubic centimeters.

To each 1,000 cubic centimeters of the polysulphide solution, there is added a slurry of freshly prepared calcium hydroxide formed by slaking 40 grams of chemically pure lime with about 200 cubic centimeters of water. The mixture, after thorough agitation, is heated mildly, say to about 120° F. About 300 cubic centimeters of alcohol is then added, the alcohol employed being any water soluble alcohol, such as ethyl, methyl, propyl, or isopropyl. As hereinbefore noted other liquid increasing the miscibility of the phase may be employed. About 180 cubic centimeters of ethylene dichloride is then added, a very small amount at a time, the rate being controlled so that the temperature of the mixture does not exceed about 140 to 150° F. with large batches, it may be necessary to provide cooling means to hold down the temperature. The mixture is kept thoroughly agitated, and the container is provided with a reflux condenser throughout the reaction.

A greenish-blue, coarsely granular powder is thrown down, and is thoroughly washed with water until free from excess polysulphides, soluble salts, etc., and with acidulated water (say $\frac{1}{2}$ N sulphuric or hydrochloric acid) to decompose and remove residual calcium salts. In the course of the washing, the powder becomes a creamy white, and is filtered out, suitably by means of a suction filter, and washed with water, and dried to constant weight. A pure white powder of hard, finely granular texture results and may be kept for long periods in vigorously boiling water without any substantial change in either color or texture. It is neither dissolved nor swollen by contact with carbon disulphide. The hard product of this character may be prepared from polysulphides of the range hereinbefore indicated, and the sulphur content of the powder, on analysis, may vary from about 63 to about 75% without any great variation in the physical properties.

The powdered product molds readily when heated to about 250 to 280° F., acquiring the consistency of a stiff dough. Some pressure is required for molding the product as, even at temperatures of 300 to 325° F., the mass does not become highly fluid. Excessively high temperatures should not be employed in molding, as they tend to produce more or less permanent depolymerization.

The powdered product lends itself readily to compounding, for example, with mineral pigments, such as iron oxide pigments, prussian blue, chrome green, aluminum or bronze powder, or the like. Fillers, such as wood flour, magnesium carbonate, whiting, carbon black, and the like may be incorporated. Rubber dyes may be employed in securing colored products, as may also insoluble lakes. The molded articles are readily machined.

A product which has primarily the characteristics of the hard plastic, but has some of those of the softer plastic, may be made in the following manner:

To each 1,000 cubic centimeters of a solution of a polysulphide of the empirical formula $Na_2S_{3.61}$ and containing 192 parts polysulphide sulphur per 1,000 cubic centimeters, there is added a slurry of about 40 grams of calcium oxide freshly slaked in 400 cubic centimeters of water and about 800 cubic centimeters of alcohol. 130 cubic centimeters of ethylene dichloride is diluted with about its own volume of alcohol and is added slowly to the vigorous agitated mixture, which has previously been heated under a reflux condenser to a temperature of 120 to 130° F. The same temperature control during reaction is exercised as in the previous example. The plastic product is thrown down as a finely granular, powdered material, and after washing with water and acid and again with water as in the previous example, is grayish white in color and does not coagulate into larger masses when treated with boiling water. To remove alcohol and other volatile constituents and to improve the odor of the material, it may be blown (while suspended in water) with a rapid current of steam, some distillate being formed. This product may be cast or molded at temperatures somewhat lower than those required for handling the harder product above described, say 220 to 300° F. Pigments, other colors and fillers may be incorporated with it in the manner previously described in connection with the harder product. The products of this type may contain from 75 to about 80 to 82% of combined surphur, corresponding to polysulphides of the formula $XS_3$ to $XS_{3.75}$.

A product of the soft type may be made in the following manner:

A polysulphide solution is employed in which the polysulphide (corrected for free sulphur) has an empirical formula of $Na_2S_{4.72}$ and containing about 143 grams of polysulphide sulphur per liter. To each 1,000 cubic centimenters of the polysulphide solution is added 900 to 920 cubic centimeters of alcohol and a slurry of about 25 grams of lime slaked in 200 cubic centimeters of water. The mixture is thoroughly agitated, heated to about 90ª F. and about 80 cubic centimeters of ethylene dichloride, diluted with an equal quantity of alcohol, added slowly, a temperature of 85 to 105° F. obtaining during reaction. The plastic product is thrown down as a soft, non-coherent powder, which is washed with cold water, dilute acid and cold water, the resulting product being of pale color and easily filtered. The non-coherent, powdered form in which the product is secured by operating in this manner greatly facilitates the purification and mixing of the material with compounding ingredients. The sulphur content of such products, on analysis, may be from 80 to 82% to 84.5%. The product, at temperatures of boiling water or slightly higher, say in a vulcanizer at 30 to 40 lbs. steam pressure, forms a tough, rubbery solid matter.

The preceding examples of my invention have been described with specific reference to the use of a slurry of calcium hydroxide and of various alcohols in the reaction mixture.

The calcium hydroxide or equivalent substance, as hereinbefore set forth, may be omitted in carrying out the reactions. However, in such case, the plastic product, as formed, displays a greater tendency to agglomorate, and to be formed as more compact masses in the products with lower sulphur content and as viscous liquids in the case of the soft product with higher sulphur content. The resulting products are some what more difficult to purify and to compound. They are however analogous in nature and properties, the calcium hydroxide or equivalent material apparently not taking part in the reaction.

The use of the alcohol or equivalent material as hereinbefore described is advantageous in rendering possible a lower temperature in the reacting mixture and in part in controlling the temperature. The percentage may vary from 10% by volume to 80% by volume on the reaction mixture, 40 to 60% being preferred. The alcohol or equivalent material may be omitted from the reaction mixture, somewhat higher temperatures being then employed in conducting the reaction. The alcohol or equivalent substance does not take part chemically in the reaction, and may be completely eliminated from the products of reaction by distillation, and recovered.

In the specific examples above set forth, the use of an excess of polysulphide in the reaction mixture has been indicated. Such excess is not necessary, as equivalent proportions, or an excess of the olefin compound employed. Furthermore, it will be understood that where ethylene dichloride has been referred to hereinbefore, it will be understood that other reactive olefin compound, eg. of propylene, butylene or higher olefins and other dihalides thereof may be used, as set forth in my prior application above referred to. The expression "olefin-polysulphide plastic" in the claims is intended to mean the material that is obtainable by causing an olefin dihalide, such as these, to react with such polysulphides as those mentioned above.

I claim:

1. In the production of an olefin-polysulphide plastic, reacting upon a stabilized aqueous polysulphide solution with a reactive olefin dihalide.

2. In the production of an olefin polysulphide plastic, reacting upon a stabilized aqueous polysulphide solution with an olefin dihalide.

3. In the production of an olefin-polysulphide plastic, reacting upon a stabilized sodium polysulphide solution with a reactive olefin dihalide.

4. In the production of an olefin-polysulphide plastic, reacting upon a stabilized aqueous polysulphide solution with ethylene dihalide.

5. In the production of an olefin-polysulphide plastic, heating an aqueous polysulfide solution to stabilize the polysulphide, and reacting upon the stabilized solution with the reactive olefin dihalide.

6. In the production of an olefin polysulphide plastic, heating an aqueous polysulphide solution to stabilize the polysulphide, and reacting upon the stabilized solution with an olefin dihalide.

7. In the production of an olefin-polysulphide plastic, heating an aqueous sodium polysulphide solution, thereby stabilizing the polysulphide, and reacting upon said stabilized solution with a reactive olefin dihalide.

8. In the production of an olefin-polysulphide plastic, heating an aqueous sodium polysulphide solution, thereby stabilizing the polysulphide, and reacting upon the stabilized solution with ethylene dihalide.

9. In the production of an olefin-polysulphide plastic, reacting upon an aqueous polysulphide solution with a reactive olefin dihalide not completely soluble therein in the presence of a liquid solvent for the olefin compound miscible with said solution.

10. In the production of an olefin-polysulphide plastic, reacting upon an aqueous polysulphide solution with a reactive olefin dihalide not completely soluble therein in the presence of an alcohol of the paraffin series.

11. In the production of an olefin polysulphide plastic, reacting upon an aqueous polysulphide solution with an olefin dihalide not completely soluble therein, in the presence of an alcohol of the paraffin series.

12. In the production of an olefin-polysulphide plastic, reacting upon an aqueous polysulphide solution with a reactive olefin dihalide not completely soluble therein in the presence of 10 to 80% of alcohol.

13. In the production of an olefin-polysulphide plastic, reacting upon an aqueous sodium polysulphide solution with a reactive olefin dihalide not completely soluble therein in the presence of a liquid solvent of the olefin compound miscible with said solution.

14. In the production of an olefin polysulphide plastic, reacting upon an aqueous polysulphide solution with an olefin dihalide not completely soluble therein in the presence of a liquid solvent for the olefin dihalide miscible with said solution.

15. In the production of an olefin-polysulphide plastic, reacting upon an aqueous sodium polysulphide solution with an ethylene dihalide in the presence of a liquid solvent for the ethylene dihalide miscible with the polysulphide solution.

16. In the production of on olefin-polysulphide plastic, reacting upon an aqueous sodium polysulphide solution with an ethylene dihalide in the presence of alcohol.

17. In the production of an olefin-polysulphide plastic, reacting upon a stabilized aqueous polysulphide solution with an ethylene dihalide in the presence of alcohol.

18. In the production of an olefin-polysulphide plastic, reacting upon an aqueous polysulphide solution with a reactive olefin dihalide in the presence of a finely divided insoluble base.

19. In the production of an olefin polysulphide plastic, reacting upon an aqueous polysulphide solution with an olefin dihalide in the presence of a finely divided insoluble base.

20. In the production of an olefin-polysulphide plastic, reacting upon an aqueous polysulphide solution with a reactive olefin dihalide in the presence of finely divided calcium hydroxide.

21. In the production of an olefin-polysulphide plastic, reacting upon an aqueous polysulphide solution with a reactive olefin dihalide in the presence of freshly slaked calcium hydroxide.

22. In the production of an olefin polysulphide plastic, reacting upon an aqueous polysulphide solution with an olefin dihalide in the presence of finely divided calcium hydroxide.

23. In the production of an olefin-polysulphide plastic, reacting upon an aqueous polysulphide solution with a reactive olefin dihalide in the presence of 1 to 5% of freshly slaked calcium hydroxide.

24. In the production of olefin-polysulphide plastic, reacting upon a stabilized aqueous polysulphide solution with a reactive olefin dihalide in the presence of a finely divided insoluble base.

25. In the production of an olefin-polysulphide plastic, reacting upon a stabilized aqueous polysulphide solution with an olefin dihalide in the presence of a finely divided insoluble base.

26. In the production of an olefin-polysulphide plastic, reacting upon an aqueous polysulphide solution with a reactive olefin dihalide in the presence of a finely divided insoluble base and a liquid solvent for the olefin compound miscible with said polysulphide solution.

27. In the production of an olefin polysulphide plastic, reacting upon an aqueous polysulphide solution with an olefin dihalide in the presence of a finely divided insoluble base and a liquid solvent for said olefin dihalide miscible with the polysulphide solution.

28. In the production of an olefin-polysulphide plastic, reacting upon an aqueous polysulphide solution with a reactive olefin dihalide in the presence of a finely divided insoluble base and alcohol.

29. In the production of an olefin polysulphide plastic, reacting upon an aqueous polysulphide solution with an olefin dihalide in the presence of a finely divided insoluble base and alcohol.

30. In the production of an olefin-polysulphide plastic, reacting upon an aqueous polysulfide solution with a reactive olefin dihalide in the presence of finely divided calcium hydroxide and alcohol.

31. In the production of an olefin-polysulphide plastic, reacting upon an aqueous polysulphide solution with an ethylene dihalide in the presence of a finely divided base and alcohol.

32. In the production of an olefin-polysulphide plastic, reacting upon an aqueous polysulphide solution with an ethylene dihalide in the presence of alcohol and finely divided calcium hydroxide.

33. In the production of an olefin-polysulphide plastic, reacting upon a stabilized aqueous polysulphide solution with an ethylene dihalide in the presence of alcohol and freshly slaked calcium hydroxide.

34. An olefin-polysulphide plastic is non-coherent, pulverulent form containing from 63 to 84.5% sulphur.

35. A pulverulent olefin-polysulphide plastic, non-coherent in aqueous suspensions at temperatures of 85° F. and higher and containing from 63 to 84.5% sulphur.

36. A pulverulent, olefin-polysulphide plastic, non-coherent in aqueous suspension at the temperature of boiling water containing up to 82% sulphur.

JOSEPH C. PATRICK.